(12) United States Patent
Rogers (10) Patent No.: US 7,478,883 B1
(45) Date of Patent: Jan. 20, 2009

(54) SIDE DUMP BODY

(76) Inventor: Ralph R. Rogers, 729 W. 21st, South Sioux City, NE (US) 68776

( * ) Notice: Subject to any disclaimer, the term of this patent is extended or adjusted under 35 U.S.C. 154(b) by 111 days.

(21) Appl. No.: 11/807,467

(22) Filed: May 29, 2007

(51) Int. Cl.
*B60P 1/16* (2006.01)
(52) U.S. Cl. .......................................... 298/18; 298/8 R
(58) Field of Classification Search ................... 298/18, 298/8 R, 22 P, 17.7
See application file for complete search history.

(56) References Cited

U.S. PATENT DOCUMENTS 4,382,631 A * 5/1983 Johnson .................. 298/17 SG
5,480,214 A 1/1996 Rogers
5,967,615 A 10/1999 Rogers
6,179,385 B1 1/2001 Rogers

* cited by examiner

*Primary Examiner*—Stephen Gordon
(74) *Attorney, Agent, or Firm*—Dennis L. Thomte; Thomte Patent Law Office (57) ABSTRACT

A side dump body including a plurality of side dump bodies pivotally mounted on a truck or trailer frame. Each of the side dump bodies may be individually pivotally moved from a transport position to a dumping position through the use of a single hydraulic cylinder whereby the contents of the dump body units may be dumped from the side of the truck or trailer. The design of the dump body is such that it has increased carrying capacity and is lightweight and less expensive to manufacture. Further, the end walls, side walls and bottom of each of the side dump bodies are secured together by an adhesive or glue rather than welding.

16 Claims, 7 Drawing Sheets

SIDE DUMP BODY

BACKGROUND OF THE INVENTION

1. Field of the Invention

This invention relates to a side dump body and more particularly to a side dump body for use on a trailer or truck and which has increased carrying capacity when compared to conventional side dump trailers. More particularly, this invention relates to a side dump body wherein a plurality of side dump bodies are mounted on a trailer or truck with each of the side dump bodies being selectively pivotally movable between transport and dumping positions by a single hydraulic cylinder.

2. Description of the Related Art

Dump bodies which are employed on trailers or trucks normally are of the end dump type or the side dump type. Since the introduction of the side dump body disclosed in applicant's U.S. Pat. No. 5,480,214, side dump trucks and trailers have experienced wide acceptance. Perhaps the only drawback to applicant's earlier side dump body is that the body does not have as much carrying capacity as an end dump body due to the fact that the side walls of the side dump body extend upwardly and outwardly from a bottom wall, rather than extending vertically upwardly from a bottom wall as in most conventional end dump bodies. The bottom dump or belly dump bodies also suffer the same drawback, since the side walls of those trailers normally extend upwardly and outwardly from a bottom wall rather than substantially vertically from a bottom wall. A further disadvantage of the conventional side dump and end dump trailers is that they are only able to haul a single commodity.

Applicant overcame the objections noted above to side dump trailers by way the inventions disclosed in U.S. Pat. Nos. 5,967,615 and 6,179,385. Although the side dump bodies of the above-identified patents performed their intended functions in an exceptional manner, the side dump bodies thereof required a hydraulic cylinder at each end of each of the side dump bodies for pivotally moving the side dump body from the transport to dumping positions and vice versa. Further, the side dump bodies of applicant's earlier patents required that the end walls, side walls and bottoms thereof be welded together which involved considerable time and expense. Further, the side dump bodies disclosed in applicant's earlier patents experienced increased weight due to the fact that a pair of hydraulic cylinders was required for each of the dump bodies.

SUMMARY OF THE INVENTION

A side dump body is disclosed which has substantially vertically disposed side walls and end walls to increase the carrying capacity of the body as compared to those side dump bodies having upwardly and outwardly extending side walls. One or more side dump bodies may be mounted on a truck or trailer. Assuming that a single dump body is utilized, first and second, horizontally spaced-apart supports are secured to the frame means of the truck or trailer. A side dump body is positioned between the first and second supports and is pivotally secured thereto. The side dump body also has a bottom wall which extends between the lower ends of the side walls and end walls. The bottom wall of the side dump body has an elongated rectangular opening formed therein at the center thereof. A hollow casing member is provided in the interior of the side dump body and has an open bottom end which is in communication with the opening formed in the bottom wall of the dump body. A cylinder base assembly is positioned within the casing member and has its lower end secured to the truck or trailer frame. A hydraulic cylinder has its base end pivotally secured to the upper inner end of the cylinder base assembly and has its rod end secured to the upper end of the casing member at the interior thereof. Extension of the hydraulic cylinder causes the dump body to be pivotally moved from a transport position to a dumping position at one side of the truck or trailer. Retraction of the hydraulic cylinder causes the side dump body to be pivotally moved from its dumping position to its transport position.

The side dump body of this invention is comprised of a lightweight tensile steel material with the sections thereof being secured together by glue or adhesive to eliminate the need for welding the same together and which thereby provides a leakproof dump body. Preferably, a plurality of the dump bodies are mounted on the truck or trailer with each of the side dump bodies being controlled by a single hydraulic cylinder which is secured to the center of the dump body to distribute the payload more evenly and allowing for a lighter trailer assembly.

It is therefore a principal object of the invention to provide an improved side dump body for use on a truck or trailer.

A further object of the invention is to provide a side dump body having an increased carrying capacity when compared to conventional side dump bodies.

Yet another object of the invention is to provide a side dump body which is pivotally moved between transport and dumping positions by a single hydraulic cylinder.

Still another object of the invention is to provide a side dump truck or trailer wherein a plurality of side dump bodies are individually selectively pivotally secured to the frame means of the truck or trailer.

Still another object of the invention is to provide a standard side dump body size which facilitates manufacture and results in a less expensive product.

Still another object of the invention is to provide a side dump body which provides a superior weight/length ratio for high quality.

Still another object of the invention is to provide a side dump body which is leakproof.

Yet another object of the invention is to provide a side dump body wherein easy access is provided for all pivoting points for trouble-free maintenance.

A further object of the invention is to provide a side dump body of the type described which is lightweight but strong and which requires a minimum of maintenance.

A further object of the invention is to provide a side dump body wherein the side walls, end walls and bottom are secured together by glue or adhesive.

These and other objects will be apparent to those skilled in the art.

DESCRIPTION OF THE PREFERRED EMBODIMENT

The side dump body of this invention is referred generally by the reference numeral 10 and comprises one or more side dump units 12 mounted on a frame means 14 which may be incorporated into a trailer or into which is commonly called a straight truck. Although the drawings illustrate the side dump body being mounted on a trailer 16, the side dump body could be mounted on a truck as described.

Frame means 14 normally comprises a pair of longitudinally extending frame members 18 and 20 which are conventionally supported on a running gear 22. For purposes of description, the frame means 14 will be described as including a forward end 24, rearward end 26, and opposite sides 28 and 30. Although the drawings illustrate the side dump bodies being able to be dumped to the driver's side of the truck or trailer, the side dump bodies could easily be modified so as to dump to the passenger side of the truck or trailer.

Inasmuch as each of the side dump units 12 are identical, only a single side dump unit 12 will be described in detail. Side dump unit 12 includes a body or tub 32 including a bottom wall 34, rear wall 36, front wall 38, and side walls 40 and 42. Each of the walls 34, 36, 38, 40 and 42 are vertically disposed and are preferably comprised of a high tensile strength steel material having a thickness of approximately 0.07 inches. The walls 34, 36, 38, 40 and 42 may be secured together by any convenient means, but it is preferred that they be secured together by an adhesive or glue material to eliminate the need for welding the same together.

Figure 1:
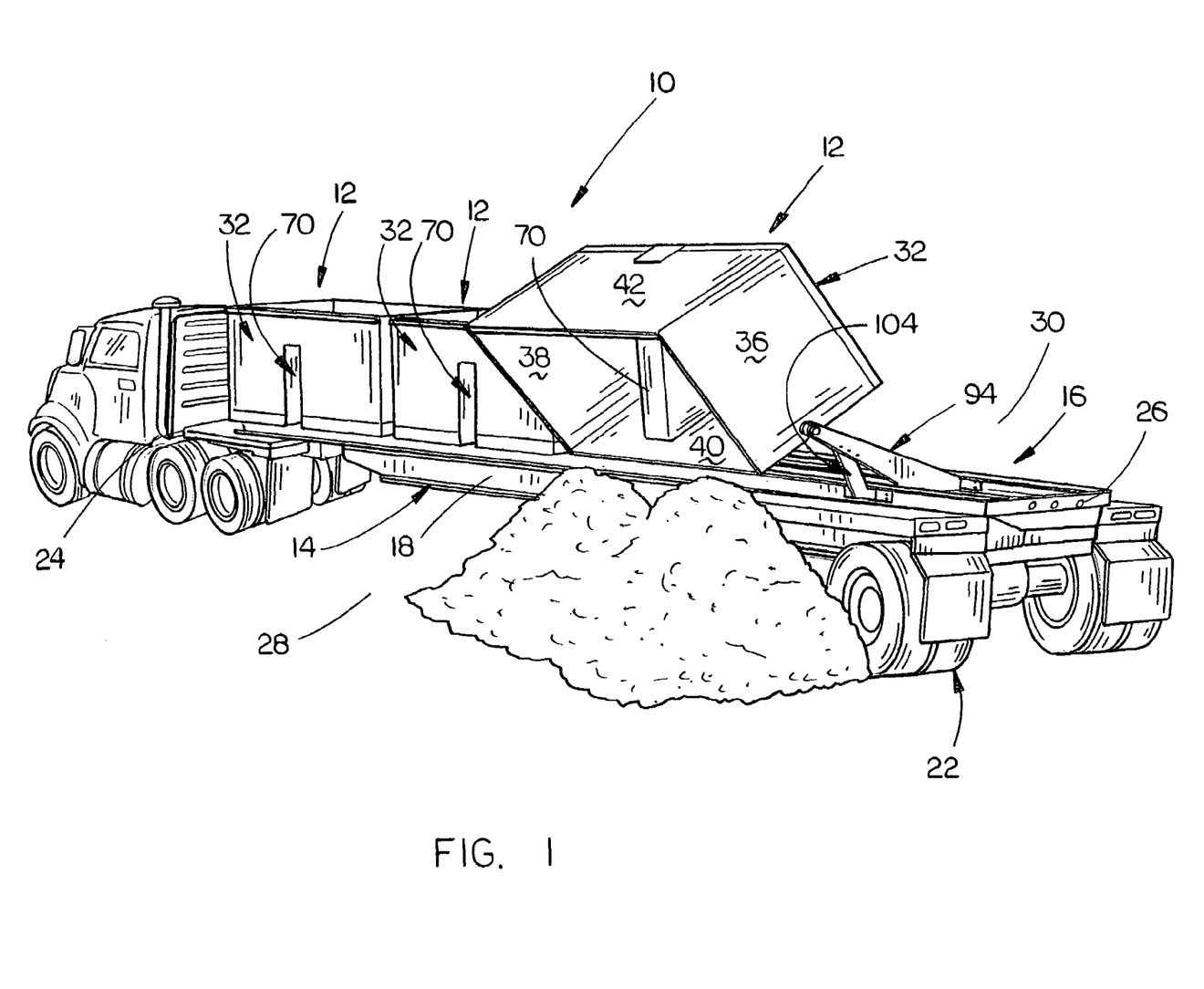
FIG. 1 is a rear perspective view of the side dump body of this invention with one of the tubs being illustrated in a dumping position.
Figure 2:
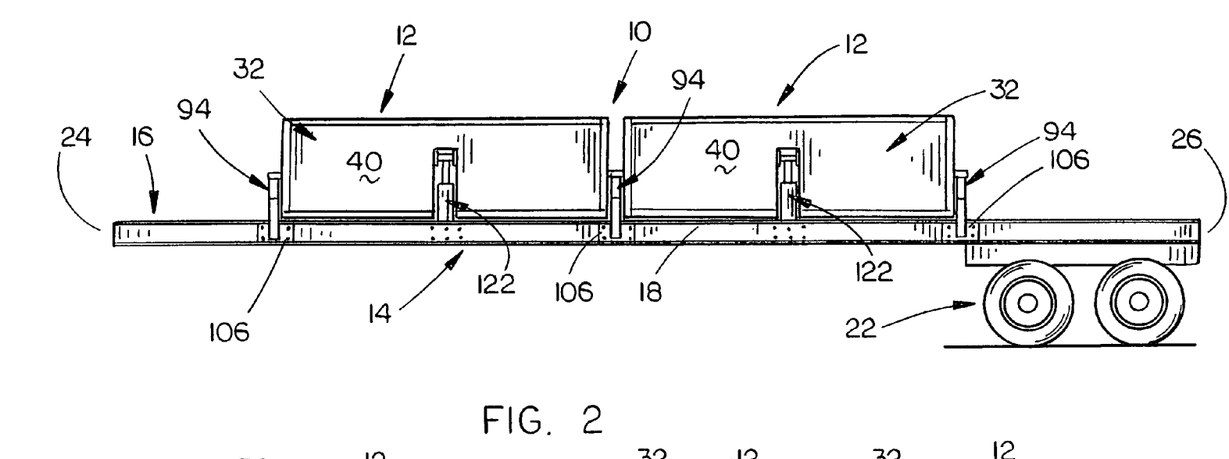
FIG. 2 is a side view of the invention wherein two tubs are utilized.
Figure 2A:
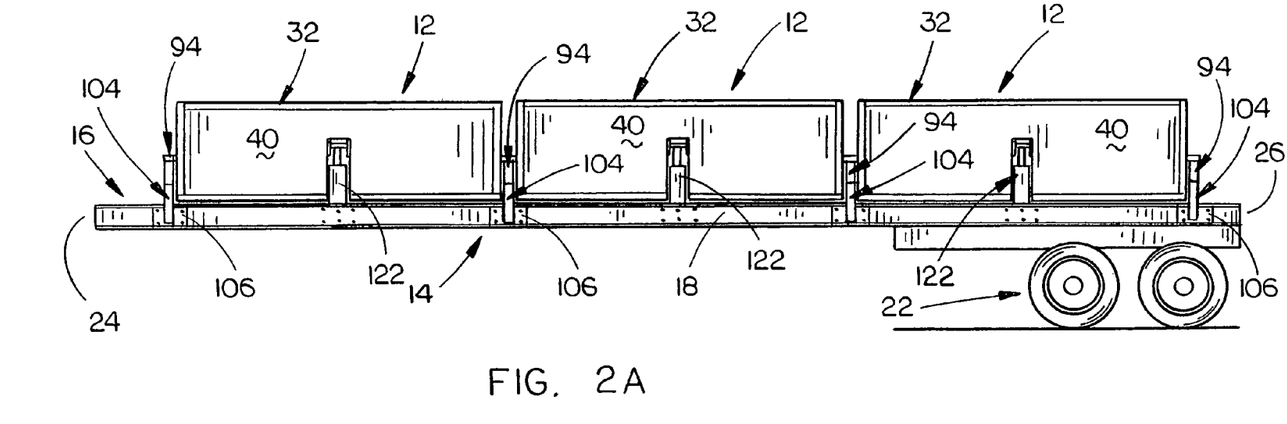
FIG. 2A is a view similar to FIG. 2 except that three tubs or bodies are utilized.
Figure 3:
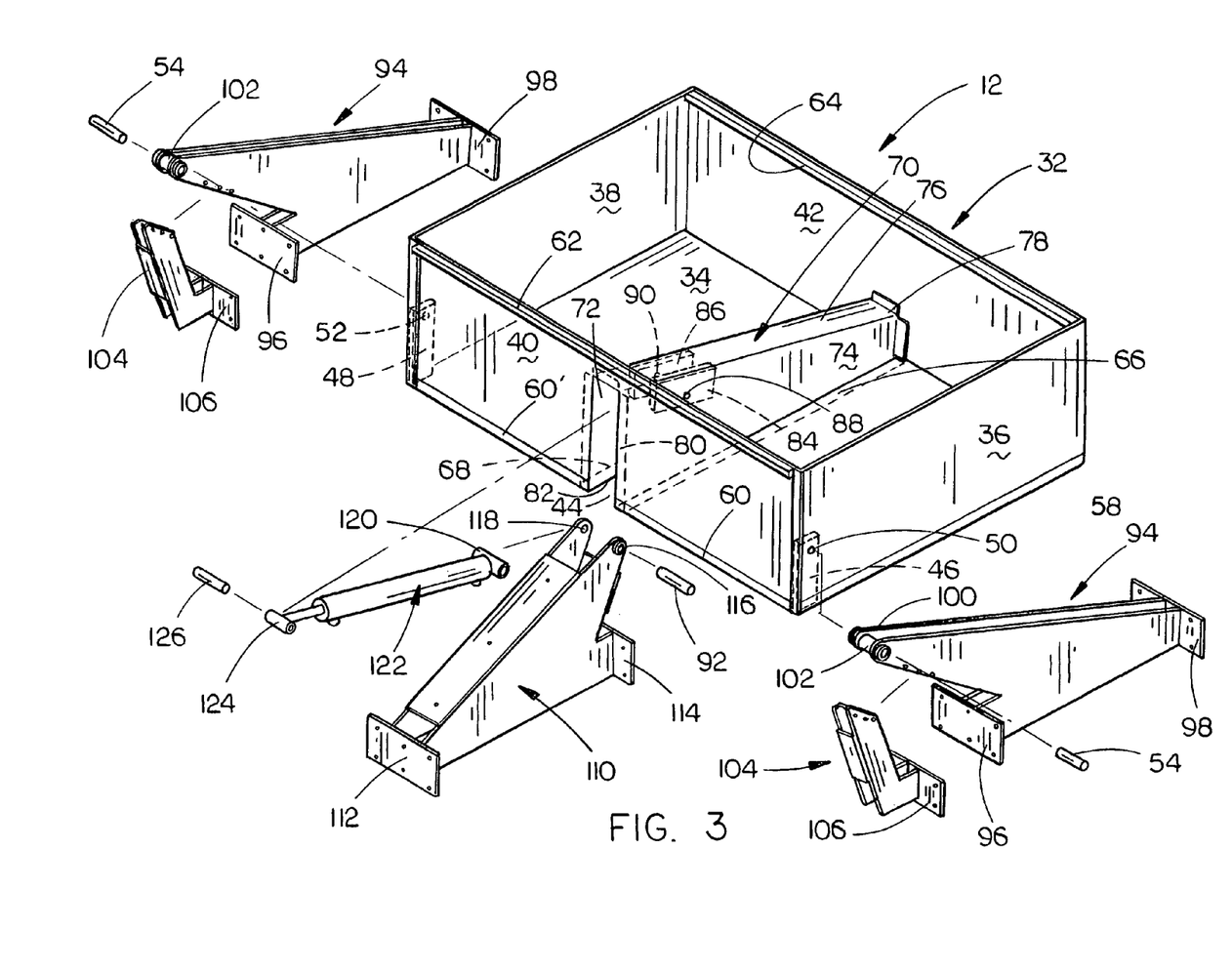
FIG. 3 is an exploded perspective view of one of the side dump bodies or tubs.
Figure 4:
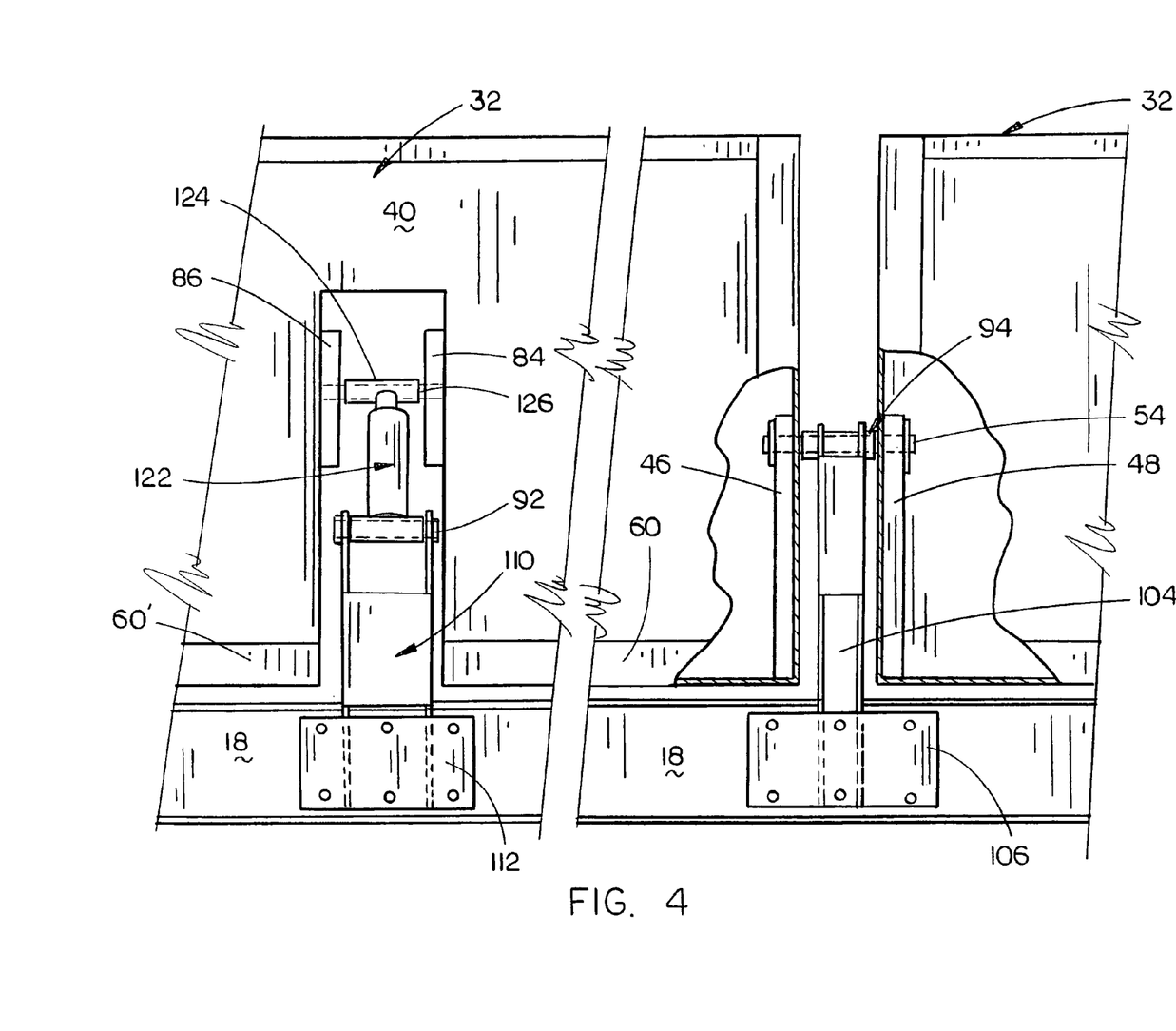
FIG. 4 is a partial side elevational view of the invention.
Figure 5:
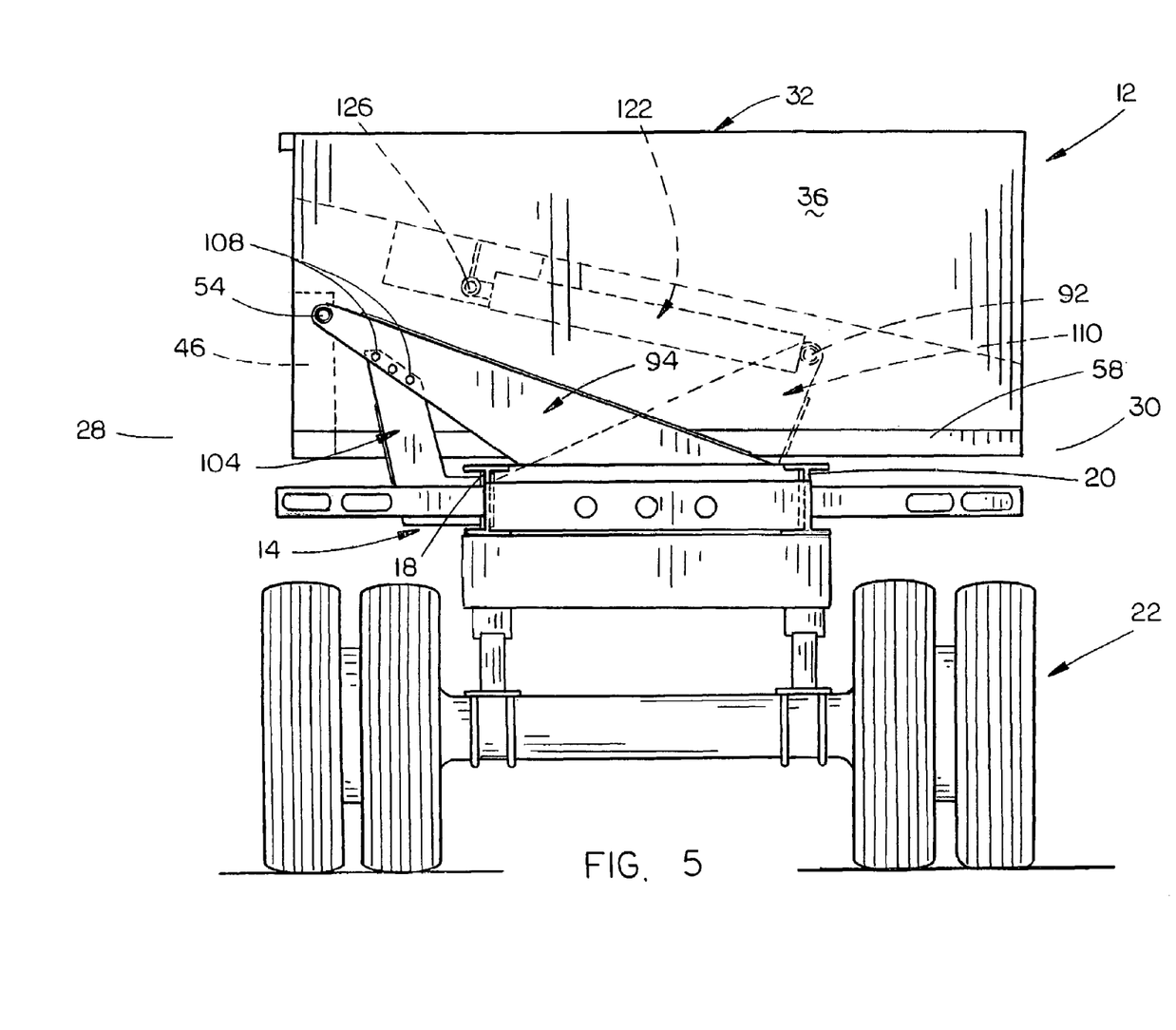
FIG. 5 is a rear elevation view of the side dump body of this invention.

Bottom wall 34 is provided with an elongated, rectangular-shaped opening 44 formed therein which extends between side walls 40 and 42, as illustrated in FIG. 3. Reinforcing posts 46 and 48 are secured to the inside surfaces of rear wall 36 and front wall 38 by any convenient means such as by glue or the like and are preferably constructed of a steel material. The posts 46 and 48 have openings 50 and 52 formed therein, respectively, adjacent the upper ends thereof which communicate with openings formed in the rear wall 36 and the front wall 38, respectively, for receiving pivot pins 54 and 56 therein, respectively.

Preferably, a steel angle member 58 is secured to the lower edge of rear wall 36 and the rearward end of floor 34 by any convenient means such as by glue or adhesive. Similarly, angle members 60 and 60' are secured to the lower ends of side wall 40 and one side of bottom 34 by glue or adhesive. Preferably, steel angle members are also provided between the lower end of side wall 42 and the side of 34 and a steel angle member is provided at the lower end of front wall 38 and the forward end of bottom 34. Preferably, an elongated steel stiffening member 62 is secured to the outer upper surface of side wall 40 by glue or adhesive and an elongated steel stiffening member 64 is secured to the upper inner surface of side wall 42 by glue or adhesive. Preferably, a pair of elongated support members 68 are secured to the underside of bottom wall 34 at the side edges of the rectangular opening 44 by glue or adhesive. Preferably, a pair of elongated, longitudinally extending support members or stiffening members 66 and 68 are secured to the underside of bottom wall 34 by glue or adhesive and extend between rear wall 36 and front wall 38.

The numeral 70 refers to a hollow, steel casing member which is positioned in tub 32 over opening 44. Casing member 70 includes a front wall 72, a back wall 74, a tapered or inclined top wall 76 extending between the upper ends of walls 72 and 74, ends 78 and 80, and an open lower end 82. Ends 78 and 80 of casing member 70 are secured to the inside surfaces of walls 42 and 40, respectively, by any convenient means such as glue or adhesive. The lower ends of walls 72 and 74 are secured to the bottom wall 34 by any convenient means such as glue or adhesive. Reinforcing plates 84 and 86 are secured to the inside surfaces of walls 72 and 74, respectively, adjacent the upper ends thereof inwardly of end 80. Plates 84 and 86 are provided with openings 88 and 90 formed therein, respectively, adapted to receive pivot pin 126 therein which extends therebetween.

The numeral 94 refers to a pivot pin support assembly which is provided at the rearward and forward ends of the tub 32. Each of the pivot pin support assemblies 94 includes plates 96 and 98 which are secured to the inside surfaces of frame members 18 and 20, respectively, by bolts or the like. As seen in FIG. 3, the pivot pin support assembly 94 has an upper outer end 100 which has a bushing 102 mounted therein which is adapted to receive the pivot pin 54 which extends through bushing 102 and the opening 50 in post 46. The pivot pin support assembly 94 which is positioned at the forward side of front wall 38 also has a bushing 102 provided at the upper outer end thereof which is adapted to receive the pivot pin 56 which is adapted to be received in the opening 52 of post 48. If a container 32 is positioned forwardly of the forward pivot pin assembly 94 illustrated in FIG. 3, the pivot pin 76 would be received by the opening 50 in the post 46 in the container 32 positioned forwardly thereof.

The numeral 104 refers to a pivot pin support brace assembly which has a plate 106 at the lower end thereof which is secured to the outer side of the frame member 18 opposite to the plate 96 by bolts or the like with the upper end of the pivot pin support brace assembly 104 being secured to the upper outer end of the pivot pin support assembly 94 by means of bolts 108.

The numeral 110 refers to a cylinder base assembly having plates 112 and 114 at the lower end thereof which are secured to the frame members 18 and 20, respectively, by bolts or the like. The upper inner end of the cylinder base assembly 110 is provided with spaced-apart bushings 116 and 118 which are adapted to receive the pivot pin 92 therein. The base end 120 of hydraulic cylinder 122 is pivotally secured to the upper inner end of cylinder base assembly 110 by means of the pivot pin 92. The rod end 124 of cylinder 122 is pivotally connected to the plates 84 and 86 by means of the pivot pin 126 extending therethrough and through the openings 88 and 90 in plates 84 and 86, respectively.

If more than one of the tubs 32 are being utilized, a single pivot pin assembly 94 will be positioned between the tubs 32. The fact that the walls and bottom of the tub 32 are glued together eliminates the need of welding the same together which not only reduces the weight of the tub but also results in the reduction of time and labor associated with the welding process. The fact that the walls and bottom are secured together by glue or adhesive also ensures that the tub will be leakproof.

Figure 6:
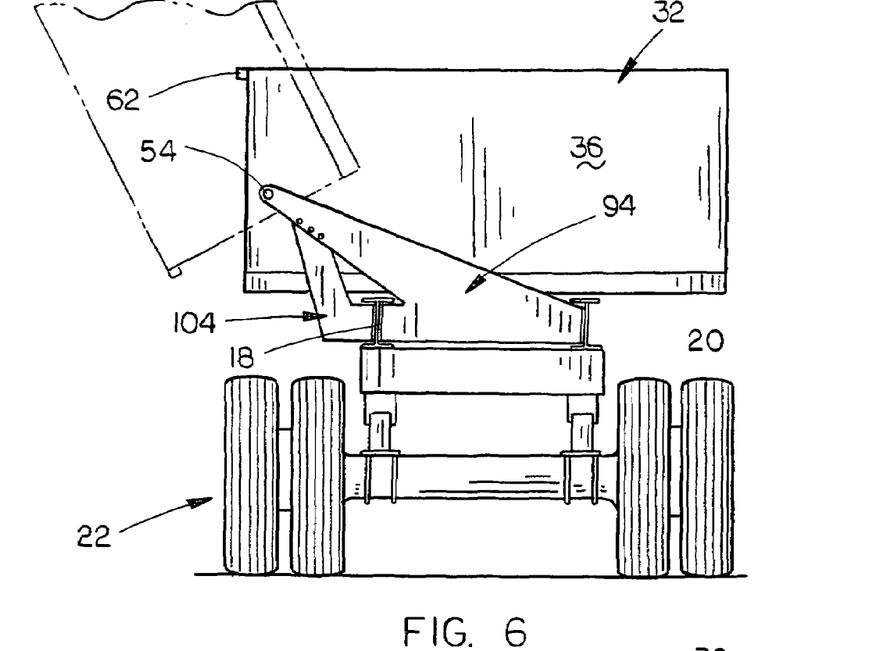
FIG. 6 is a rear view of one of the side dump bodies of this invention with the broken lines illustrating the dumping position of the body.
Figure 7:
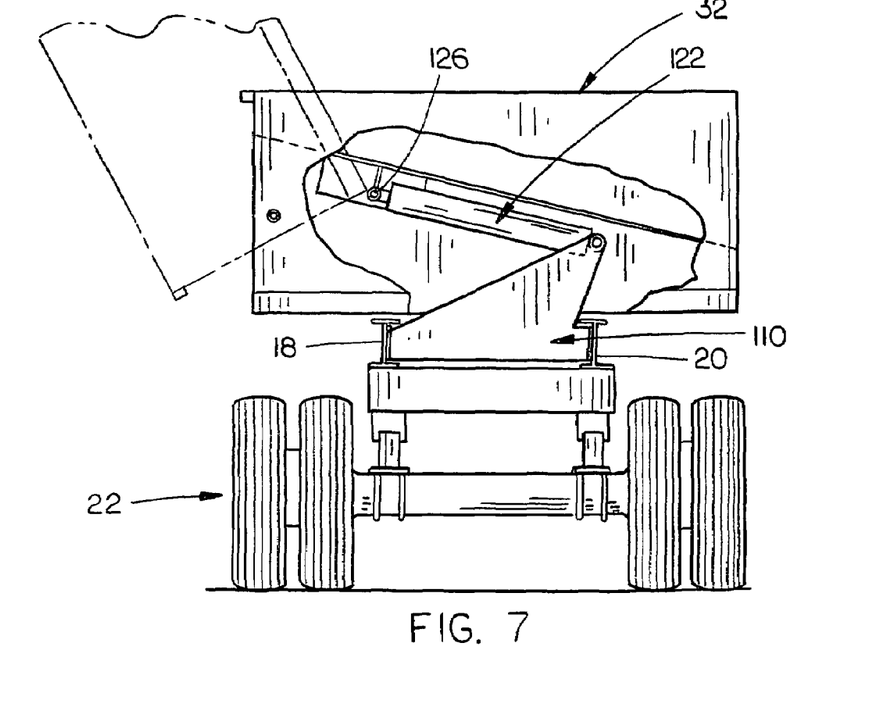
FIG. 7 is a view similar to FIG. 6 except that portions thereof have been cut away to more fully illustrate the invention.

Extension of the hydraulic cylinder 122 causes the tub 32 to pivotally move from the solid line transport position of FIG. 6 to the dotted line dumping position illustrated in FIG. 7.

Retraction of the hydraulic cylinder 122 causes the tub 32 to be pivotally moved from the dotted line dumping position of FIG. 7 to the solid line transport position of FIG. 6.

The fact that a single hydraulic cylinder is required to pivotally move the tub 32 eliminates the need of a second cylinder as is shown in applicant's earlier patents which therefore reduces the cost and weight of the tub.

Figure 8:
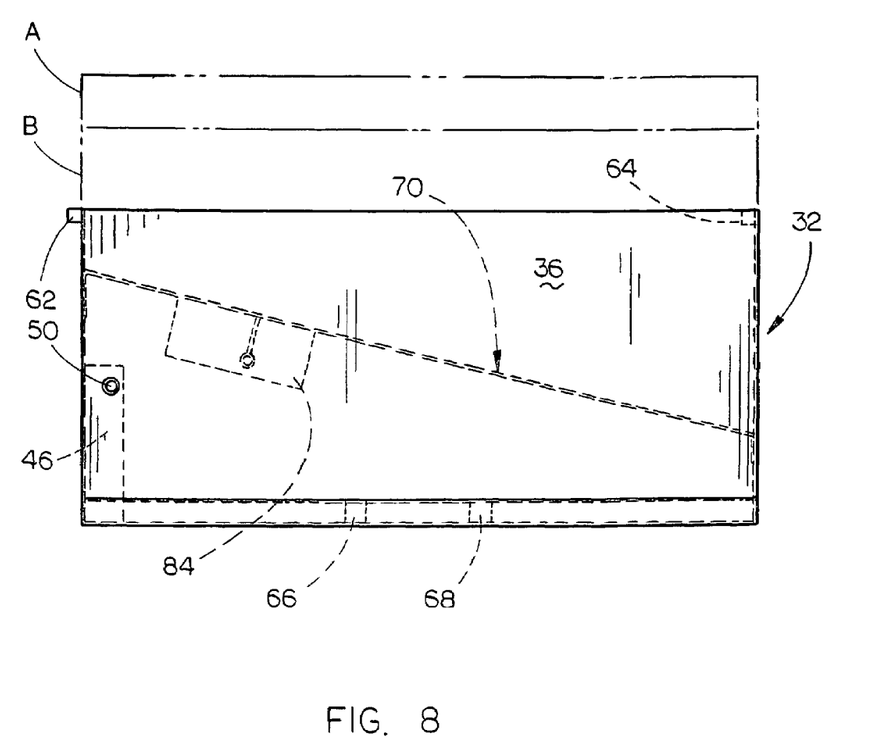
FIG. 8 is a rear elevational view of one of the dump bodies with the upper broken lines illustrating the manner in which the height of the body may be increased.

If it is desired to increase the height of the tub 32, additional end wall sections and side wall sections may be glued to the upper end of the tub 32, as illustrated by the broken lines in FIG. 8. Preferably, the wall sections which are added to the existing wall sections will be six inches high or nine inches high or any number or combination thereof. The six inch sections are referred to by the reference letter A while the nine inch sections are referred to by the reference letter B.

Thus it can be seen that the invention accomplishes at least all of its stated objectives.

I claim:

1. In combination:
   a wheeled frame means having a rearward end, a forward end, and first and second sides;
   a first upstanding support having upper and lower ends;
   said first upstanding support secured to said frame means and extending upwardly therefrom;
   a second upstanding support having upper and lower ends;
   said second upstanding support secured to said frame means and extending upwardly therefrom in a spaced-apart relationship with respect to said first support;
   a first dump body positioned between said first and second supports and being pivotally secured thereto so as to be movable from a transport position to a dumping position at said first side of said frame means;
   said first dump body including a front wall portion, a back wall portion, a bottom wall portion, and first and second side wall portions;
   said bottom wall portion of said first dump body having a centrally located rectangular-shaped opening formed therein which extends generally parallel to said front and back wall portions;
   a first elongated, hollow upstanding casing member having an open bottom portion, a closed top portion, a front wall, a back wall spaced from said front wall, a first end and a second end;
   said first casing member being positioned in said dump body and secured thereto so that said open bottom portion thereof is positioned above said rectangular-shaped opening in said bottom wall portion of said dump body;
   a third upstanding support secured to said frame means and extending upwardly therefrom and having upper and lower ends;
   a first hydraulic cylinder having a base end and a rod end;
   said base end of said first hydraulic cylinder being operatively pivotally secured to said third upstanding support adjacent said second side of said frame means and extending upwardly and transversely therefrom towards said first side of said frame means so as to be received by an interior of said casing member;
   said rod end of said first hydraulic cylinder being pivotally secured to said casing member adjacent said first end beneath said closed top portion thereof;
   extension of said first hydraulic cylinder causing said first dump body to pivotally move with respect to said first and second supports from its said transport position to its said dumping position;
   retraction of said hydraulic cylinder causing said first dump body to pivotally move with respect to said first and second supports from its said dumping position to its said transport position.

2. The combination of claim 1 wherein said front wall portion and said back wall portion are glued to said bottom wall portion and said first and second side wall portions.

3. The combination of claim 1 wherein a plurality of dump bodies, including said first dump body, are individually selectively pivotally mounted on said frame means with each of those dump bodies being pivotally movable by a single hydraulic cylinder.

4. The combination of claim 1 wherein said front, back, first side, and second side wall portions of said dump body are substantially vertically disposed when in their said transport position and wherein said front, back, first side, and second side wall portions of said dump body have substantially the same height.

5. The combination of claim 1 wherein said first end of said casing member has a greater height than said second end thereof.

6. The combination of claim 1 wherein said first and second ends of said casing member are secured to said first and second side wall portions of said dump body, respectively.

7. In combination:
   a wheeled frame means having a rearward end, a forward end, and first and second sides;
   a first upstanding support having upper and lower ends;
   said first upstanding support secured to said frame means and extending upwardly therefrom;
   a second upstanding support having upper and lower ends;
   said second upstanding support secured to said frame means and extending upwardly therefrom in a spaced-apart relationship with respect to said first support;
   a first dump body positioned between said first and second supports and being pivotally secured thereto so as to be movable from a transport position to a dumping position at said first side of said frame means;
   said first dump body including a front wall portion, a back wall portion, a bottom wall portion, and first and second side wall portions;
   said bottom wall portion of said first dump body having a centrally located rectangular-shaped opening formed therein which extends generally parallel to said front and back wall portions thereof;
   a first elongated, hollow upstanding casing member having an open bottom portion, a closed top portion, a front wall, a back wall spaced from said front wall, a first end and a second end;
   said first casing member being positioned in said first dump body and secured thereto so that said open bottom portion thereof is positioned above said rectangular-shaped opening in said bottom wall portion of said first dump body;
   a third upstanding support secured to said frame means and extending upwardly therefrom and having upper and lower ends;
   a first hydraulic cylinder having a base end and a rod end;
   said base end of said first hydraulic cylinder being operatively pivotally secured to said third upstanding support adjacent said second side of said frame means and extending upwardly and transversely therefrom towards said first side of said frame means so as to be received by an interior of said first casing member;
   said rod end of said first hydraulic cylinder being pivotally secured to said first casing member adjacent said first end beneath said closed top portion thereof;

extension of said first hydraulic cylinder causing said first
dump body to pivotally move with respect to said first
and second supports from its said transport position to its
said dumping position;

retraction of said first hydraulic cylinder causing said first
dump body to pivotally move with respect to said first
and second supports from its said dumping position to its
said transport position;

a fourth upstanding support having upper and lower ends;

said fourth upstanding support secured to said frame means
and extending upwardly therefrom;

said fourth upstanding support secured to said frame means
and extending upwardly therefrom in a spaced-apart
relationship with respect to said second support;

a second dump body positioned between said second and
fourth supports and being pivotally secured thereto so as
to be movable from a transport position to a dumping
position at said first side of said frame means;

said second dump body including a front wall portion, a
back wall portion, a bottom wall portion, and first and
second side wall portions;

said bottom wall portion of said second dump body having
a centrally located rectangular-shaped opening formed
therein which extends generally parallel to said front and
back wall portions thereof;

a second elongated, hollow upstanding casing member
having an open bottom portion, a closed top portion, a
front wall, a back wall spaced from said second casing
member front wall, a first end and a second end;

said second casing member being positioned in said second
dump body and secured thereto so that said open bottom
portion thereof is positioned above said rectangular-
shaped opening in said bottom wall portion of said sec-
ond dump body;

a fifth upstanding support secured to said frame means and
extending upwardly therefrom and having upper and
lower ends;

a second hydraulic cylinder having a base end and a rod
end;

said base end of said second hydraulic cylinder being
operatively pivotally secured to said fifth support mem-
ber and extending upwardly and transversely therefrom
towards said first side of said frame means so as to be
received by an interior of said second casing member;

said rod end of said second hydraulic cylinder being piv-
otally secured to said second casing member adjacent
said first end beneath said closed top portion thereof;

extension of said second hydraulic cylinder causing said
second dump body to pivotally move with respect to said
second and fourth supports from its said transport posi-
tion to its said dumping position;

retraction of said second hydraulic cylinder causing said
second dump body to pivotally move with respect to said
second and fourth supports from its said dumping posi-
tion to its said transport position.

8. The combination of claim 7 wherein said front wall portion and said back wall portion of said second dump body are glued to said bottom wall portion and said first and second side wall portions thereof.

9. The combination of claim 7 wherein said front, back, first side, and second side wall portions of said first and second dump bodies are substantially vertically disposed when in their said transport position and wherein said front, back, first side, and second side wall—for added clarity portions of said first and second dump bodies have substantially the same height.

10. The combination of claim 7 wherein said first end of each of said first and second casing members have a greater height than the respective second end thereof.

11. The combination of claim 7 wherein each of said first and second casing members are secured to said first and second side wall portions of the associated dump body.

12. In combination:
a wheeled frame means having a rearward end, a forward end, and first and second sides;
a first upstanding support having upper and lower ends;
said first upstanding support secured to said frame means and extending upwardly therefrom;
a second upstanding support having upper and lower ends;
said second upstanding support secured to said frame means and extending upwardly therefrom in a spaced-apart relationship with respect to said first support;
a first dump body positioned between said first and second supports and being pivotally secured thereto so as to be movable from a transport position to a dumping position at said first side of said frame means;
said first dump body including a front wall portion, a back wall portion, a bottom wall portion, and first and second side wall portions;
said bottom wall portion of said first dump body having a centrally located rectangular-shaped opening formed therein which extends generally parallel to said front and back wall portions thereof;
a first elongated, hollow upstanding casing member having an open bottom portion, a closed top portion, a front wall, a back wall spaced from said front wall, a first end and a second end;
said first casing member being positioned in said first dump body and secured thereto so that said open bottom portion thereof is positioned above said rectangular-shaped opening in said bottom wall portion of said first dump body;
a third upstanding support secured to said frame means and extending upwardly therefrom and having upper and lower ends;
a first hydraulic cylinder having a base end and a rod end;
said base end of said first hydraulic cylinder being opera-
tively pivotally secured to said third support and extend-
ing upwardly and transversely therefrom towards said
first side of said frame means so as to be received by an
interior of said first casing member;
said rod end of said first hydraulic cylinder being pivotally
secured to said first casing member adjacent said first
end beneath said closed top portion thereof;
extension of said first hydraulic cylinder causing said first
dump body to pivotally move with respect to said first
and second supports from its said transport position to its
said dumping position;
retraction of said hydraulic cylinder causing said first
dump body to pivotally move with respect to said first
and second supports from its said dumping position to its
said transport position;
a fourth upstanding support having upper and lower ends;
said fourth upstanding support secured to said frame means
and extending upwardly therefrom in a spaced-apart
relationship with respect to said second support;
a second dump body positioned between said second and
fourth supports and being pivotally secured thereto so as
to be movable from a transport position to a dumping
position at said first side of said frame means;
said second dump body including a front wall portion, a
back wall portion, a bottom wall portion, and first and
second side wall portions;

said bottom wall portion of said second dump body having a centrally located rectangular-shaped opening formed therein which extends generally parallel to said front and back wall portions thereof;

a second elongated, hollow upstanding casing member having an open bottom portion, a closed top portion, a front wall, a back wall spaced from said second casing member front wall, a first end and a second end;

said second casing member being positioned in said second dump body and secured thereto so that said open bottom portion thereof is positioned above said rectangular-shaped opening in said bottom wall portion of said second dump body;

a fifth upstanding support secured to said frame means and extending upwardly therefrom and having upper and lower ends;

a second hydraulic cylinder having a base end and a rod end;

said base end of said second hydraulic cylinder being operatively pivotally secured to said fifth support and extending upwardly and transversely therefrom towards said first side of said frame means so as to be received by an interior of said second casing member;

said rod end of said second hydraulic cylinder being pivotally secured to said second casing member adjacent said first end of said second casing member beneath said closed top portion thereof;

extension of said second hydraulic cylinder causing said second dump body to pivotally move with respect to said second and fourth supports from its said transport position to its said dumping position;

retraction of said second hydraulic cylinder causing said second dump body to pivotally move with respect to said second and fourth supports from its said dumping position to its said transport position;

a sixth upstanding support having upper and lower ends;

said sixth upstanding support secured to said frame means and extending upwardly therefrom in a spaced-apart relationship with respect to said fourth support;

a third dump body positioned between said fourth and sixth supports and being pivotally secured thereto so as to be movable from a transport position to a dumping position at said first side of said frame means;

said third dump body including a front wall portion, a back wall portion, a bottom wall portion, and first and second side wall portions;

said bottom wall portion of said third dump body having a centrally located rectangular-shaped opening formed therein which extends generally parallel to said front and back wall portions thereof;

a third elongated, hollow upstanding casing member having an open bottom portion, a closed top portion, a front wall, a back wall spaced from said third casing member front wall, a first end and a second end;

said third casing member being positioned in said third dump body and secured thereto so that said open bottom portion thereof is positioned above said rectangular-shaped opening in said bottom wall portion of said third dump body;

a seventh upstanding support secured to said frame means and extending upwardly therefrom and having upper and lower ends;

a third hydraulic cylinder having a base end and a rod end;

said base end of said third hydraulic cylinder being operatively pivotally secured to said seventh support and extending upwardly and transversely therefrom towards said first side of said frame means so as to be received by an interior of said third casing member;

said rod end of said third hydraulic cylinder being pivotally secured to said third casing member adjacent said first end of said third casing member beneath said closed top portion thereof;

extension of said third hydraulic cylinder causing said third dump body to pivotally move with respect to said fourth and sixth supports from its said transport position o its said dumping position;

retraction of said third hydraulic cylinder causing said third dump body to pivotally move with respect to said fourth and sixth supports from its said dumping position to its said transport position.

13. The combination of claim 12 wherein said respective front wall portion and said respective back wall portion of each of said dump bodies are glued to said respective bottom wall portion and said respective first and second side wall portions thereof.

14. The combination of claim 12 wherein said front, back, first side, and second side wall portions of each of said dump bodies are substantially vertically disposed when in their respective said transport position and wherein respective said front, back, first side, and second side wall portions of said dump bodies have substantially the same height.

15. The combination of claim 12 wherein respective said first ends of said casing members have a greater height than respective said second ends thereof.

16. The combination of claim 12 wherein said casing members are secured to respective said first and second side wall portions of the associated dump bodies.

* * * * *